(12) United States Patent
Cao et al.

(10) Patent No.: US 9,606,348 B2
(45) Date of Patent: Mar. 28, 2017

(54) OPTICAL WHEEL

(75) Inventors: Simon Cao, Shanghai (CN); Louis Chen, Shanghai (CN); Chai Sing Lim, Singapore (SG)

(73) Assignee: MATERION CORPORATION, Mayfield Heights, OH (US)

( * ) Notice: Subject to any disclaimer, the term of this patent is extended or adjusted under 35 U.S.C. 154(b) by 374 days.

(21) Appl. No.: 14/237,221

(22) PCT Filed: Jun. 7, 2012

(86) PCT No.: PCT/GB2012/051283
§ 371 (c)(1),
(2), (4) Date: Feb. 5, 2014

(87) PCT Pub. No.: WO2013/024246
PCT Pub. Date: Feb. 21, 2013

(65) Prior Publication Data
US 2014/0154453 A1    Jun. 5, 2014

(30) Foreign Application Priority Data

Aug. 16, 2011   (GB) .................................. 1114084.5

(51) Int. Cl.
*G02B 26/00* (2006.01)
*F21S 10/00* (2006.01)
*F21V 9/10* (2006.01)
*G03B 21/20* (2006.01)

(52) U.S. Cl.
CPC .......... *G02B 26/008* (2013.01); *F21S 10/007* (2013.01); *F21V 9/10* (2013.01); *G03B 21/204* (2013.01); *Y10T 428/21* (2015.01); *Y10T 428/216* (2015.01); *Y10T 428/24612* (2015.01); *Y10T 428/24868* (2015.01); *Y10T 428/24876* (2015.01)

(58) Field of Classification Search
CPC ............ Y10T 428/21; Y10T 428/24802; F21S 10/007; F21V 9/00
See application file for complete search history.

(56) References Cited

U.S. PATENT DOCUMENTS

| 5,021,931 A | 6/1991 | Matsui et al. |
| 7,547,114 B2 | 6/2009 | Li et al. |
| 7,651,243 B2 | 1/2010 | McGuire, Jr. et al. |
| 2010/0315604 A1* | 12/2010 | Peeters ................ G02B 26/008 353/84 |
| 2010/0328617 A1 | 12/2010 | Masuda | |

FOREIGN PATENT DOCUMENTS

| EP | 1480467 A2 | 11/2004 |
| EP | 1605199 A2 | 12/2005 |
| WO | WO2004/021461 A2 | 3/2004 |
| WO | WO2006/089089 A2 | 8/2006 |
| WO | WO2009/069010 A1 | 6/2009 |

OTHER PUBLICATIONS

International Search Report for corresponding PCT Application Serial No. PCT/GB2012/051283; dated Aug. 22, 2012.
Search Report for corresponding United Kingdom Application Serial No. GB1114084.5; dated Dec. 16, 2011.

* cited by examiner

*Primary Examiner* — Gerard Higgins
(74) *Attorney, Agent, or Firm* — Richard M. Klein; Fay Sharpe LLP

(57) ABSTRACT

A phosphor wheel comprises a wavelength conversion portion. The wavelength conversion portion comprises a wavelength conversion material optically integrated with at least one convex surface.

26 Claims, 5 Drawing Sheets

OPTICAL WHEEL

TECHNICAL FIELD OF THE INVENTION

The invention concerns a phosphor wheel having a wavelength conversion element, such as a phosphor. It may also relate to a method of manufacturing an phosphor wheel of such a type.

BACKGROUND TO THE INVENTION

Projection systems may use a colour wheel to generate light of different colours from a light source. The light source typically provides white light. The colour wheel may comprise a circular substrate with surface segments of different colours. When the colour wheel is rotated with light incident upon it, its output provides light of varying colour.

A phosphor wheel is a similar device in which some or all segments of the surface of circular substrate are coated with a wavelength conversion material, such as a phosphor. The phosphor is often mixed with the glue or other transparent material for application to the substrate surface. Different phosphors may be used in different segments to provide more than one emission colour output.

Wavelength conversion materials such as phosphors receive and absorb excitation light of a first wavelength and emit light of a second, different wavelength. They may be used to generate light of specific wavelengths, where the optical power output for light sources providing that wavelength directly is limited.

Improving the efficiency of phosphor wheels is a challenge, particularly for use in projection systems. Projection systems are often desirably compact and can also have thermal requirements.

U.S. Pat. No. 7,547,114 describes a phosphor wheel in which a dichroic element is disposed between excitation light and the wavelength conversion material. The dichroic element transmits the excitation light and reflects light emitted by the wavelength conversion material, thereby improving the proportion of received light that is converted. This results in an efficiency improvement.

U.S. Pat. No. 7,651,243 also relates to a phosphor wheel and shows a recycling element, which passes light emitted by the phosphor within a range of angles, but reflects light emitted outside that angle range. This focuses the emitted light, also to increase efficiency.

These efficiency improvements are incremental. It is desirable to addressing other issues in wave conversion materials to further improve their efficiency.

SUMMARY OF THE INVENTION

Against this background, the present invention provides a phosphor wheel comprising a wavelength conversion portion, the wavelength conversion portion comprising a wavelength conversion material optically integrated with at least one convex surface.

The wavelength conversion material is optically integrated with at least one convex surface such that light enters and emerges from the wavelength conversion material through the at least one convex surface. In other words, it may be considered that there is a direct optical path between the wavelength conversion material and the convex surface, with only a small proportion of light being refracted or reflected at the interface. The one or more convex surfaces can be formed in the same layer as the wavelength conversion material or in an adjacent layer with substantially direct optical propagation between the two layers.

By forming the wavelength conversion material with a convex surface through which light enters and emerges from the material, a number of advantages are gained. Firstly, excitation light is focused on the wavelength conversion material, thereby coupling in this light. The convex surface is partially or completely optically transparent, which may assist with this. Such optical coupling may obviate the need for an additional condenser or collimated focusing lens, which has high requirements such as a short focal length. Such components can be expensive. Furthermore, this improvement makes the distance between the colour wheel or phosphor wheel and the optical components preceding it less critical. In existing, earlier approaches the focusing distance needs to be short and is very sensitive to ensure proper light focusing.

Moreover, a secondary benefit of the convex surface is a reduction in Total Internal Reflection (TIR). It has been surprisingly observed that when the wavelength conversion material, for example a phosphor coating, has a flat surface, a signification proportion of the emitted light is reflected by the interface between the material and air (or other ambient) due to TIR. This results in lost light and an efficiency reduction. By changing the shape of the surface interfacing the wavelength conversion material with air (or other ambient), the effect of TIR is mitigated. Thus, the at least one convex surface is advantageously shaped to mitigate or avoid total internal reflection of light incident on the convex surface, especially light emitted from the wavelength conversion material.

In some embodiments, a convex surface may mean a surface with a curvature along at least 25%, 50%, 75%, 85%, 90%, 95% or substantially 100% of the area of the wavelength conversion material, such that the surface is essentially convex. Additionally or alternatively, the gradient of the convex surface at any point may be no greater than 15, 10, 9, 8, 7, 6 or 5. By gradient, this may be understood as the ratio of a continuous surface span to surface height in a cross-sectional plane of the surface perpendicular to the plane of the wavelength conversion portion.

Preferably, the wavelength conversion portion comprises a first part having the wavelength conversion material and a second part in which the at least one convex surface is formed. Optionally, the second part does not comprise a wavelength conversion material. In the preferred embodiment, the first part is a first layer of material and the second part comprises a second layer of material adherent to the first layer. This typically implies that the second layer of material is located directly adjacent the first layer, with no other optically significant material in between. Alternatively, the first part and the second part may be integrally formed. Thus, the at least one convex surface and the wavelength conversion material may be formed using one layer. Nevertheless, this layer may be made from more than one material.

Beneficially, the second part has substantially the same refractive index as the first part or at least 80% of the refractive index of the first part. In this sense, the same refractive index means that the difference in refractive indices between the two layers in combination with the shape of the convex surface is not sufficient to cause TIR for light emitted from a flat surface of the first layer, across substantially the whole width (or at least 80%, 85%, 90%, 95% or 99% of the width) of the convex surface. Optionally, the second layer of material can have a higher refractive index. It will be appreciated from Snell's Law and the Fresnel Equations that the refractive indices of the wavelength conversion material and the second layer of material may be relevant to the extent of TIR that occurs. By using a second layer of material with substantially the same or higher refractive index as the wavelength conversion material, TIR can be avoided at the interface between the first and second layers. In less preferred embodiments, a portion or all of the second layer of material may have a refractive index that is less than the refractive index of wavelength conversion material. In any of these cases, the ratio between the refractive index of the second layer of material and the refractive index of the wavelength conversion material (or the inverse of that ratio) may be at least 70%, 75%, 80%, 85%, 90%, 95% or 99%.

Optionally, the first layer can be formed as a coating. Additionally or alternatively, the second layer can be formed as a coating.

In the preferred embodiment, the second part is optically transparent. This allows all light received at the optical component to reach the wavelength conversion material and for all light emitted by the wavelength conversion material to pass through the second layer of material. Alternatively, the second layer of material can be optically transparent to only a limited range or ranges of wavelengths, so as to act as a colour filter.

Preferably, the wavelength conversion material comprises a plurality of wavelength conversion elements within a carrier material. More preferably, the at least one convex surface is formed from the same material as the carrier material. Beneficially, the refractive index of the wavelength conversion material is dominated by that of the carrier material. Even more preferably, the carrier material is a glue. The wavelength conversion elements may optionally be phosphor powder particles. In other words, the at least one convex surface is formed using the same material as forms the main part of the wavelength conversion material. This may further allow the material forming the at least one convex surface to have substantially the same refractive index as the wavelength conversion material.

In many embodiments, the phosphor wheel further comprises a substrate. Then, the at least one convex surface may be formed using a coating on the substrate. This coating may be configured to have a dome shape. The dome shape can be a spherical cap (a portion of a sphere lying above or below a specific plane). Where the coating is on the substrate, it need not be directly adjacent to the substrate and the wavelength conversion material may form an additional layer in between the substrate and the coating forming the at least one convex surface.

Advantageously, the substrate is circular or cylindrical. In such embodiments, the wavelength conversion portion may cover at least a part of an outer surface of the substrate. For example, the wavelength conversion material may be formed as a ring covering a portion of the outer surface of a circular substrate. Optionally, the substrate may be either transparent or reflective. When the substrate is reflective, excitation light may be beneficially received at the wavelength conversion portion through the same convex surface as that through which converted light is emitted. This may mitigate the need for additional light focusing components and relax requirements on alignment of the rigid wheel axis position. When the substrate is transparent, excitation light may be received at the wavelength conversion portion through a first surface and converted light may be emitted from the wavelength conversion material through a second surface. In some cases, the first surface may be convex. In others, the second surface may be convex. Optionally, both the first and second surfaces may be convex.

In some embodiments, the wavelength conversion material is optically integrated with a plurality of convex surfaces. The plurality of convex surfaces may be formed as a ring of multiple convex dome shapes. This appears similar to a fly eye ring structure.

Advantageously, the wavelength conversion material is a phosphorescence material, such as a phosphor. Other types of wavelength conversion materials may alternatively be used.

In a second aspect, there is provided a method of manufacturing a phosphor wheel comprising: providing a wavelength conversion portion, the wavelength conversion portion comprising a wavelength conversion material; and forming at least one convex surface optically integrated with the wavelength conversion material. Process steps to form any of the features in respect of the optical component described herein may optionally be carried out in conjunction with this method. Some of these optional process steps are now detailed.

Preferably, the wavelength conversion portion comprises a first part having the wavelength conversion material wherein the step of forming at least one convex surface comprises forming a second part of the wavelength conversion portion in which the at least one convex surface is formed.

In the preferred embodiment, the first part is a first layer of material and the step of forming at least one convex surface may comprise adhering the second part comprising a second layer of material to the first layer. Alternatively, the first part and the second part are integrally formed.

Preferably, the second part has substantially the same refractive index as the first part. Advantageously, the second part is optically transparent.

In the preferred embodiment, the wavelength conversion material comprises a plurality of wavelength conversion elements within a carrier material. Optionally, the step of forming the at least one convex surface may comprise forming the at least one convex surface from the same material as the carrier material. In some embodiments, the carrier material is a glue.

In some embodiments, the step of providing a wavelength conversion portion may comprise forming the wavelength conversion material on a substrate. Then, the step of forming the at least one convex surface optionally comprises forming a coating on the substrate, configured to have a dome shape.

Advantageously, the substrate may be circular or cylindrical and the wavelength conversion portion is provided to cover at least a part of an outer surface of the substrate. The substrate may be either transparent or reflective. When the substrate is reflective, excitation light may be received at the wavelength conversion material through the same convex surface as that through which light converted by the wavelength conversion material is emitted.

In some embodiments, the step of forming at least one convex surface comprises forming a plurality of convex surfaces optically integrated with the wavelength conversion portion, the plurality of convex surfaces being formed as a ring of multiple convex dome shapes.

Beneficially, the wavelength conversion material is a phosphorescence material.

In a further aspect, the present invention may encompass a colour wheel comprising a colouring portion, the colouring portion comprising a colouring material optically integrated with at least one convex surface. In other words, rather than implementing the invention as a phosphor wheel, a colour wheel might be employed instead. The other features described above and herein in relation to the phosphor may additionally or alternatively be used together with such a colour wheel.

It will also be understood that the present invention is not limited to the specific combinations of features explicitly disclosed, but also any combination of features that are described independently and which the skilled person could implement together.

BRIEF DESCRIPTION OF THE DRAWINGS

The invention may be put into practice in various ways, a number of which will now be described by way of example only and with reference to the accompanying drawings in which.

DETAILED DESCRIPTION OF PREFERRED EMBODIMENTS

Figure 1:
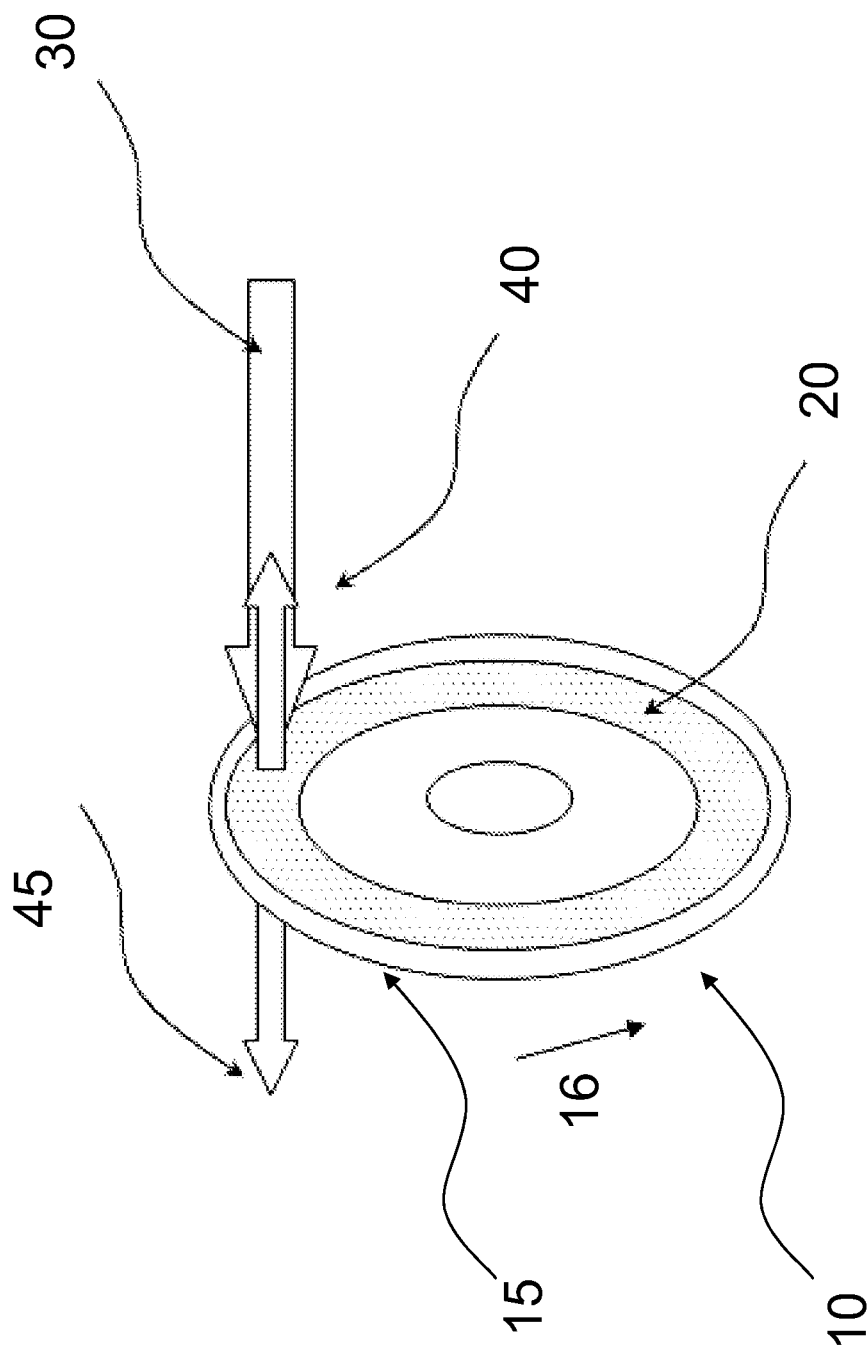
FIG. 1 shows an existing phosphor wheel, showing a mode of operation.

In FIG. 1, there is shown an existing phosphor wheel, which can be used in an optical projector, for example. The phosphor wheel 10 comprises: a plate 15; and a wavelength conversion material 20.

The plate 15 is circular and may be either transparent or reflective. The plate 15 may be termed a substrate. It is attached to a motor (not shown), to cause it to rotate as shown by arrow 16.

A wavelength conversion material 20 is disposed on the plate 15. The wavelength conversion material 20 has a ring shape, which is typical. The wavelength conversion material 20 may be made of a phosphor and glue mixture or it may be a phosphor ceramic. Phosphors for converting blue to green light are commonly used. Any structure or material that can convert the wavelength of received light in a similar way to a phosphor can of course be used instead.

The excitation light 30 propagates and illuminates the wavelength conversion material (phosphor) 20, which generates emission light of a different wavelength to that of the excitation light. Phosphor wheels can reflect the converted light (when the wheel is a mirror) or transmit the converted light (when the wheel is transparent). In the former case, the converted light 40 is emitted at the same side of the plate 15 as that at which the excitation light 30 is received. In the latter case, the converted light 45 is emitted on the opposite side of the plate 15 relative to the side on which the excitation light 30 is received.

Figure 2:
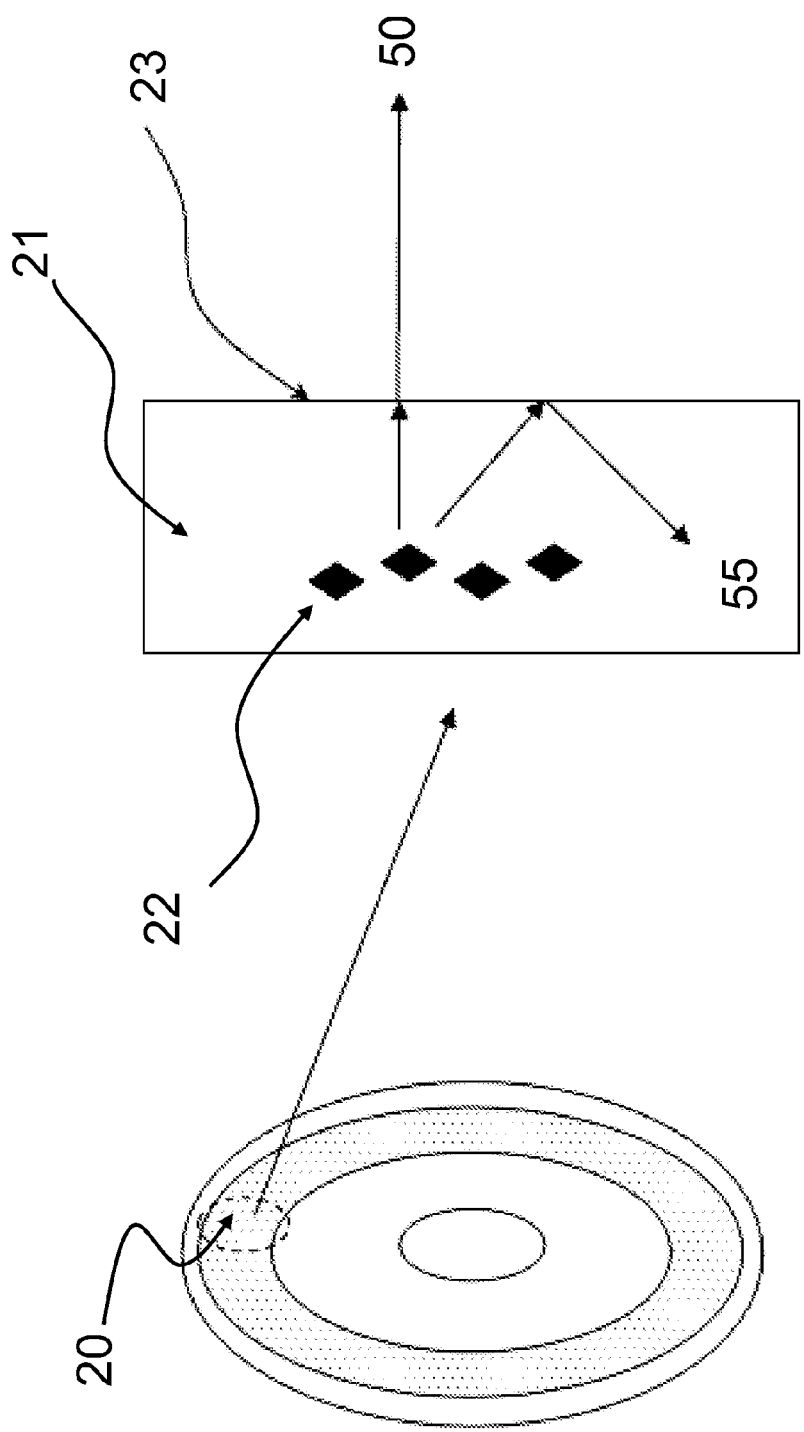
FIG. 2 illustrates a known phosphor coating used in the embodiment shown in FIG. 1.

Referring next to FIG. 2, there is shown a known phosphor coating used in the embodiment shown in FIG. 1. The phosphor coating 20 is formed using a glue 21 mixed with phosphor powder 22. The glue 21 is transparent and is formed as a layer, often with a flat surface 23. Such a phosphor coating 20 may be termed an immersed light source.

With this structure, some of the light emitted by the phosphor particles 22 is transmitted through the flat surface 23. This is shown with exemplary light ray 50. Other parts of the light emitted by the phosphor particles 22 are reflected at the glue-air surface 23, due to Total Internal Reflection (TIR) and re-scattered in the wavelength conversion material 20 (which is a mixture, as noted above). In some cases, the light reflected due to TIR may be a significantly portion of the total light emitted by the phosphor powder 22, resulting in efficiency degradation.

Figure 3:
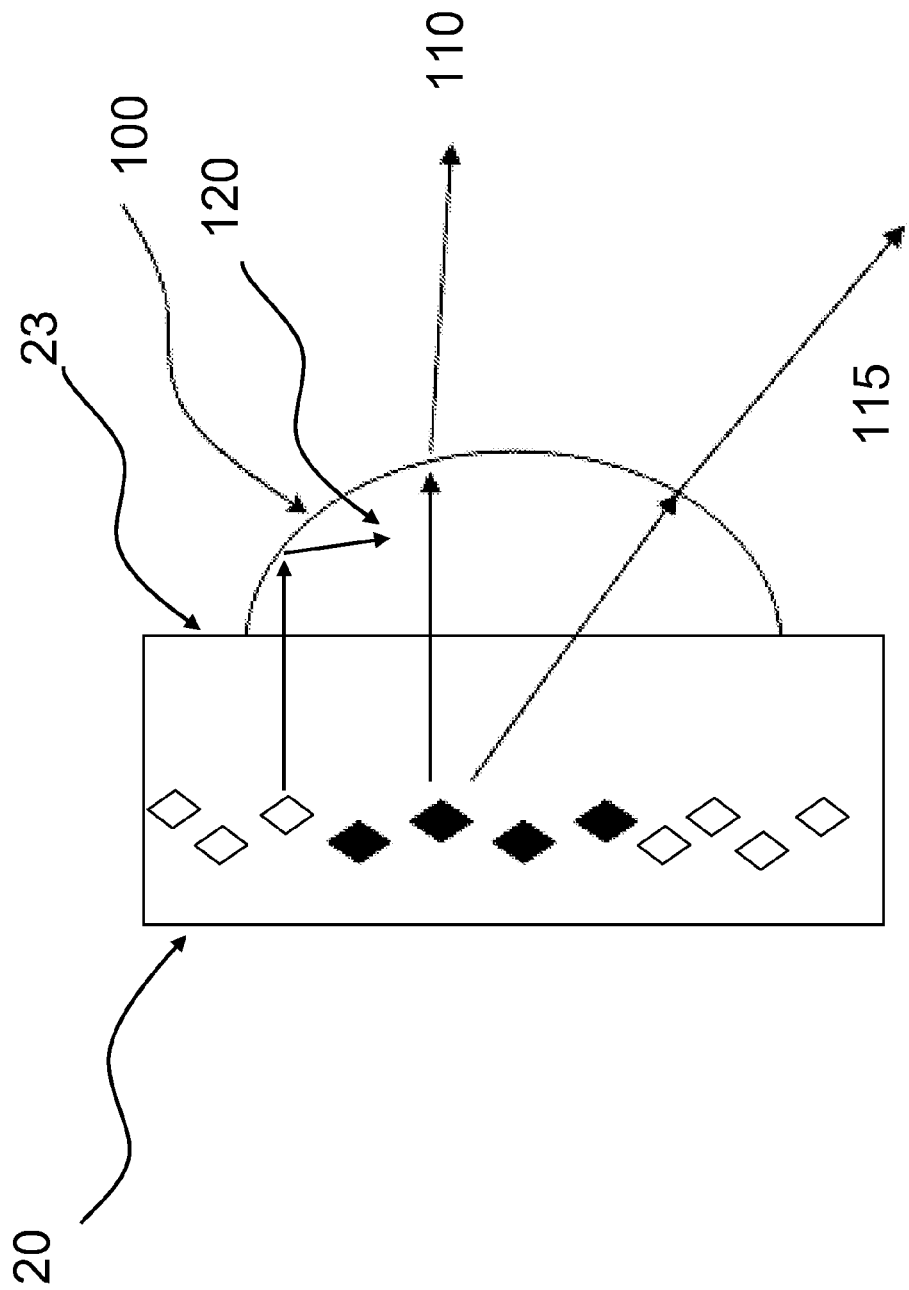
FIG. 3 shows a first embodiment in accordance with the present invention, illustrating emission of light from a wavelength conversion material.

Referring next to FIG. 3, there is shown a first embodiment in accordance with the present invention. Where the same features are shown as illustrated in FIG. 2, identical reference numerals are employed. A second layer 100 is formed with a convex surface on the flat surface 23 of the wavelength conversion material 20. The second layer 100 is formed using the same type of transparent glue 21 as used to form the wavelength conversion material 20 shown in FIG. 2.

FIG. 3 also illustrates emission of light from the wavelength conversion material. Light emitted by the wavelength conversion material 20 is coupled through the second layer 100 and this is shown by exemplary first ray 110 and second ray 115. The effects of TIR are mitigated.

Refraction (and TIR) at the interface between the wavelength conversion material 20 and the second layer 100 is mitigated, since the refractive index of the second layer 100 is approximately the same as that of the wavelength conversion material 20, since they are formed using essentially the same main component. Where the wavelength conversion material 20 comprises phosphor elements mixed with glue (as discussed with reference to FIG. 2 above), the effective refractive index for the wavelength conversion material 20 is essentially the glue refractive index.

Refraction between two media at the contact interface obeys the Fresnel equations, such that $n_1 * \sin A_1 = n_2 * \sin A_2$, where $n_1$ is the refractive index of the material through which light is incident on the interface, $A_1$ is the angle of incidence (to the normal), $n_2$ is the refractive index of the other material and $A_2$ is the angle (to the normal) of the refracted light. When the refractive indices of the two materials are different, the critical angle is the angle of incidence at which and above which, only TIR will occur.

The convex surface of the second layer 100 reduces the effect of TIR, because the convex surface reduces the angle of incidence at the interface between the second layer 100 and the ambient (air). The angle of incidence can be close to zero for the most part. However, this may not apply across the whole area at which the second layer is applied. For example, towards the edges of the second layer 100, the angle of incidence may be high and TIR may still occur. This is shown by exemplary ray 120.

Figure 4:
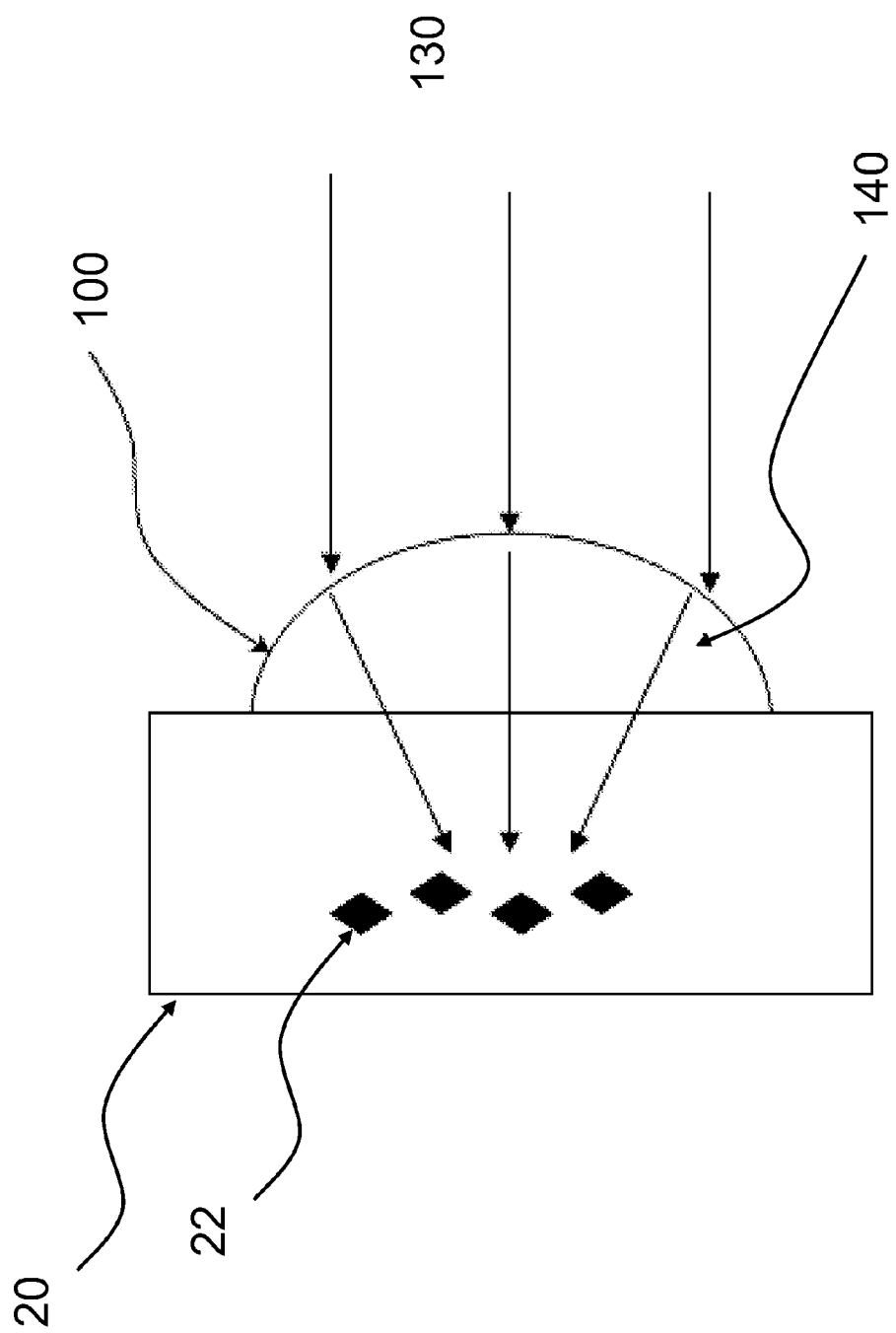
FIG. 4 depicts the embodiment of FIG. 3, showing how light is received at the wavelength conversion material.

Referring now to FIG. 4, there is shown the embodiment of FIG. 3, showing how light is received at the wavelength conversion material. This drawing shows how excitation light 130 is coupled into the phosphor wheel. It can be seen that a parallel excitation light 130 is refracted into focused light 140 onto the phosphor powder 21 in the wavelength conversion material 20. This avoids the need for the excitation light 130 to be condensed and a focusing optical lens or similar component might be omitted through the use of the second layer 100. The angle of incidence requirements for the parts and coating is therefore also made less onerous.

Figure 5:
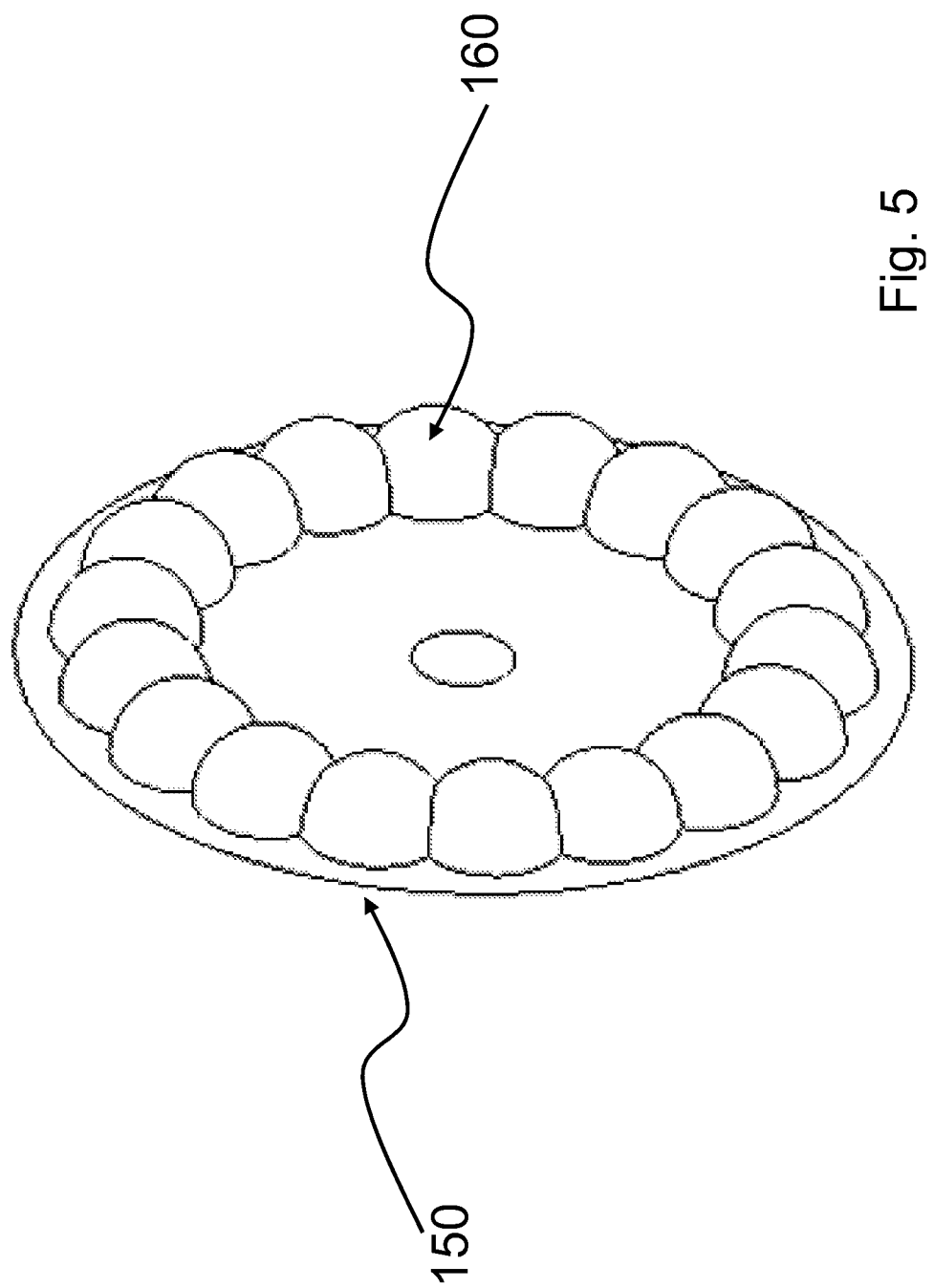
FIG. 5 illustrates a second embodiment of the present invention, showing the profile of the whole phosphor wheel.

This convex surface can be a single convex surface ring that has a convex shape in the radius direction of the plate substrate. Alternatively, a fly eyes ring structure may be used. FIG. 5 shows a second embodiment of the present invention, with such a structure. A fly eyes ring structure uses a plurality of dome (or spherical cap) shaped second layers aligned with the ring of wavelength conversion material 20 shown in FIGS. 1 and 2.

Although embodiments of the invention have been described above, the skilled person may contemplate various modifications or substitutions.

For example, the second layer 100 can be made using glue or glass and by processes including dispensing or moulding. Other suitable methods can be used to create the convex surface shape providing the functionality described above.

The refractive index of the layer providing the convex surface or surfaces is usually approximately the same or higher than that of the wavelength conversion material layer. However, the skilled person will appreciate that the refractive index of the layer providing the convex surface or surfaces may be less than that of the wavelength conversion material layer. In either case, the refractive index ratio between the two layers may be at least 0.8, but the ratio may be lower than this dependent upon the shape of the convex layer.

The embodiments above describe a two layer structure, with the convex surface being formed by a second layer. Alternatively, the first and second layers may be combined into one layer made from a single material with a convex surface. Moreover, it will be understood that alternative substrates to the plate 15 described above can be used. In other embodiments, no substrate may be used, for example when a phosphor wheel is made from a ceramic phosphor. In such cases, the phosphor is formed with a convex surface, in line with the present invention.

Although FIGS. 1 and 2 show examples of a phosphor wheel with a circular substrate, a substrate with a cylindrical (drum) shape can alternatively be used. For example, the structure shown in FIG. 3A of U.S. Pat. No. 7,651,243 may be employed. Whilst phosphor mixed with glue has been described, different materials can be used for the wavelength conversion material, for example pure phosphor or phosphor ceramic. For ceramic, the refractive index of the ceramic material may be a crystal index. To effect the present invention using a ceramic material, a transparent ring can be formed with a material having a matched refractive index and this may be bonded to the ceramic surface. Alternatively, a glue or other transparent layer or coating may be applied directly to the ceramic surface to form the convex surface.

The invention claimed is:

1. A phosphor wheel comprising:
    a first layer that is a wavelength conversion portion, the wavelength conversion portion comprising a wavelength conversion material having a flat surface; and
    a second layer directly adjacent the first layer, the second layer comprising at least one convex surface, and wherein the second layer is directly on the flat surface of the wavelength conversion portion.

2. The phosphor wheel of claim 1, wherein the second layer is adhered to the first layer.

3. The phosphor wheel of claim 1, wherein the first layer and the second layer are integrally formed.

4. The phosphor wheel of claim 1, wherein the second layer has a refractive index which is at least 80% of the refractive index of the first layer.

5. The phosphor wheel of claim 1, wherein the second layer is optically transparent.

6. The phosphor wheel of claim 1, wherein the wavelength conversion material comprises a plurality of wavelength conversion elements within a carrier material.

7. The phosphor wheel of claim 6, wherein the second layer is also formed from the carrier material.

8. The phosphor wheel of claim 1, further comprising a substrate, wherein the wavelength conversion portion covers at least a part of an outer surface of the substrate, and wherein the second layer is formed using a coating on the first layer.

9. The phosphor wheel of claim 8, wherein the substrate is circular or cylindrical.

10. The phosphor wheel of claim 9, wherein the substrate is either transparent or reflective.

11. The phosphor wheel of claim 9, wherein the substrate is reflective.

12. The phosphor wheel of claim 1, wherein the wavelength conversion material is optically integrated with the at least one convex surface, wherein the at least one convex surface comprises a plurality of convex surfaces, the plurality of convex surfaces being formed as a ring of multiple convex dome shapes.

13. The phosphor wheel of claim 1, wherein the wavelength conversion material is a phosphorescent material.

14. A method of manufacturing a phosphor wheel comprising:
    providing a first layer that is a wavelength conversion portion, the wavelength conversion portion comprising a wavelength conversion material and having a flat surface; and
    forming a second layer directly adjacent the first layer, the second layer comprising at least one convex surface, and wherein the second layer is directly on the flat surface of the wavelength conversion portion.

15. The method of claim 14, the step of forming the second layer directly adjacent the first layer comprises adhering the second layer to the first layer.

16. The method of claim 14, wherein the first layer-and the second layer are integrally formed.

17. The method of claim 14, wherein the second layer has substantially the same refractive index as the first layer.

18. The method of claim 14, wherein the second layer is optically transparent.

19. The method of claim 14, wherein the wavelength conversion material comprises a plurality of wavelength conversion elements within a carrier material.

20. The method of claim 19, wherein the second layer is also formed from the carrier material.

21. The method of claim 14, wherein the step of providing a wavelength conversion portion comprises forming the wavelength conversion material on a substrate and wherein the step of forming the second layer comprises forming a coating on the first layer to have a dome shape that includes the at least one convex surface.

22. The method of claim 21, wherein the substrate is circular or cylindrical and the wavelength conversion material covers at least a part of an outer surface of the substrate.

23. The method of claim 22, wherein the substrate is either transparent or reflective.

24. The method of claim 22, wherein the substrate is reflective.

25. The method of claim 14, wherein the at least one convex surface is a plurality of convex surfaces, and wherein the step of forming the second layer comprises forming the plurality of convex surfaces on the first layer, the plurality of convex surfaces being formed as a ring of multiple convex dome shapes.

26. The method of claim 14, wherein the wavelength conversion material is a phosphorescent material.

* * * * *